Oct. 5, 1943.    C. I. MacNEIL    2,331,128
POWER INDICATOR
Filed Jan. 17, 1942
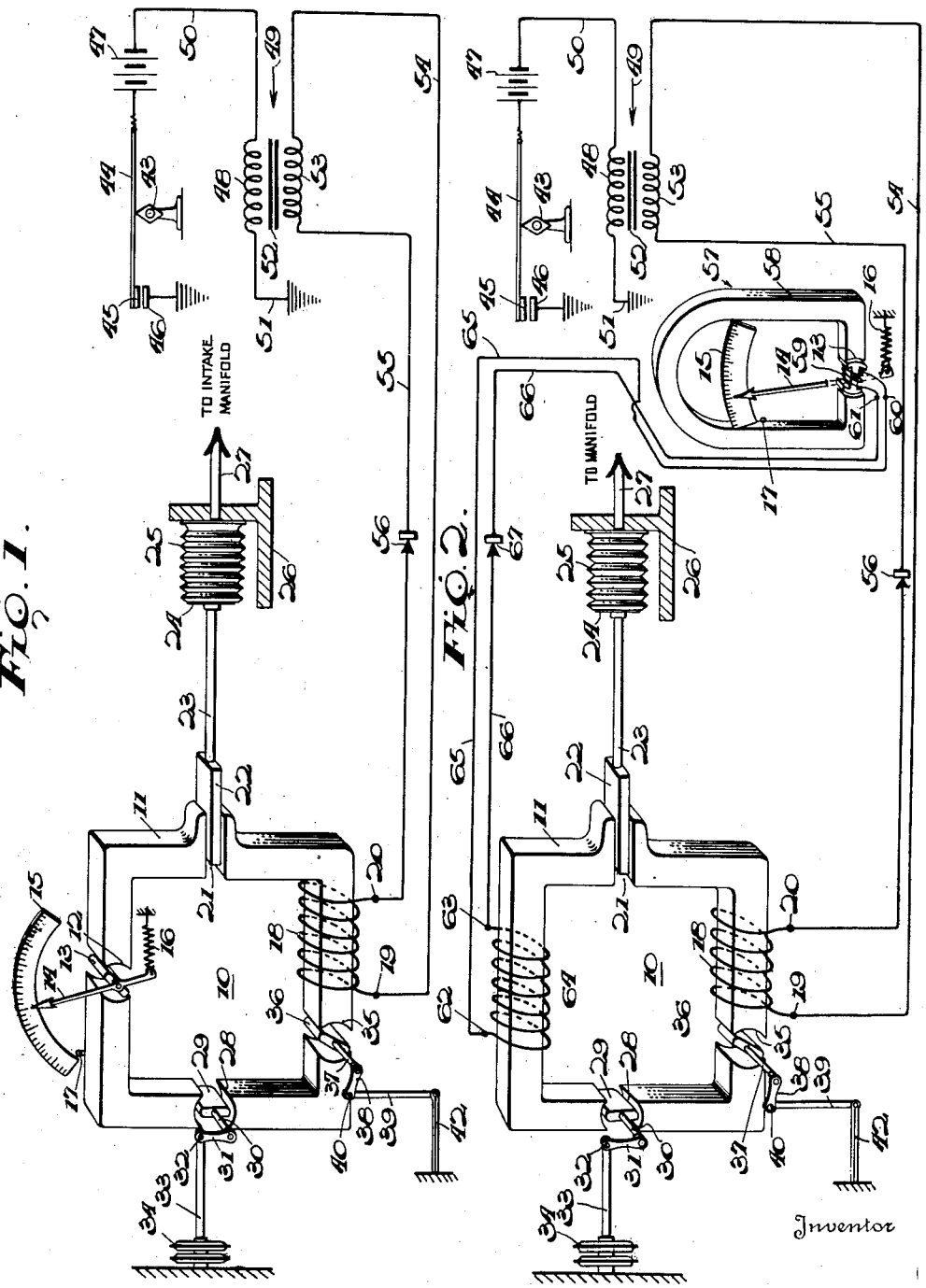
Inventor
Charles I. MacNeil.
By David F. Doody.
Attorney Patented Oct. 5, 1943

2,331,128

UNITED STATES PATENT OFFICE 2,331,128

POWER INDICATOR

Charles I. MacNeil, Glen Ridge, N. J., assignor to Bendix Aviation Corporation, South Bend, Ind., a corporation of Delaware Application January 17, 1942, Serial No. 427,182

8 Claims. (Cl. 73—30)

This invention relates to power indicating instruments, and more particularly to instruments for indicating the horsepower or power output of an internal combustion engine.

Many power measuring and indicating instruments have been devised for showing the power output and the change of output of an internal combustion engine, both for automotive and aviation applications. Particularly in the aviation field, it is desired to have a power output instrument for observation by the pilot or navigator of an aircraft, and examples of power meters applied to aviation uses are shown in the patents to Manchester 2,130,591 and Reichel et al., 2,070,842. These patents, aside from showing a particular manner of obtaining power indications in accordance with engine speed and engine intake manifold pressure, show means for compensating for variables brought about by the altitude of the power plant and the temperature change in the gas passing through the intake manifold.

It is an object of the present invention to provide a power measuring and indicating system wherein engine speed and manifold pressure are measured by reference to changes in current and reluctance in an electromagnetic indicating circuit.

Another object includes the provision of an electromagnetic indicating device wherein both manifold pressure and engine speed are interpreted as changes in electrical and magnetic characteristics in the structure of the indicating device.

Other objects will appear from a study of the following specification when made in conjunction with the attached drawing, throughout which like numerals designate like parts, and wherein Fig. 1 is a diagrammatic representation of one form of the present invention, and Fig. 2 is a diagrammatic representation of a second embodiment of the present invention.

In general, the present invention comprises an indicating meter based upon standard electrical voltmeter structure, wherein the winding on a ferromagnetic core sets up a magnetic circuit in accordance with the current in said winding, the value of which depends upon the product of speed and manifold pressure of the engine, the power of which is being measured. The flux in the magnetic circuit traverses not only the conventional rotor gap, but also an additional gap of uniform cross-section, in which is positioned a permeable member movable under the influence of a bellows open to intake manifold pressure (suitably compensated for changes in altitude by well known means), so that the total reluctance in the magnetic indicating circuit may be varied in accordance with the manifold pressure of the engine. Compensation for certain variable conditions is also made by the use of air gaps and means for adjusting the reluctance thereof, as will be explained below.

In the drawing, 10 represents an electrical meter of somewhat standard voltmeter construction, including a core of generally uniform cross-section 11, which may be made of soft iron or any of the conventional ferromagnetic substances now available. Core 11 has a conventional rotor air-gap 12, in which is mounted a magnetic rotor member 13, suspended in conventional meter bearings. Rotor 13 carries a pointer 14, which, in cooperation with a scale 15, is intended to give indications of engine horsepower. A spring member 16, which is shown schematically, but which may be the ordinary spiral spring used in meter movements, urges pointer 14 to bear against the stop pin 17 at the zero end of scale 15. Core 11 carries an electrical winding 18, having terminals 19 and 20. A second air-gap 21 of constant cross-section interrupts the continuity of core 11. Gap 21 contains a bar 22 of soft iron or other ferromagnetic material, which is mounted for sliding movement transversely of gap 21. One end of bar 22 is attached to a rigid link or connecting rod 23, having one end fixed to a movable wall 24 of flexible metallic bellows 25. Bellows 25 is rigidly mounted upon a bracket 26 through the vertical wall of which extends a conduit 27 for connection with the intake manifold of an engine.

A third air-gap 28 is formed in core 11, and has a rotor member 29 of soft iron or other ferromagnetic substance, pivoted therein upon a shaft 30. Shaft 30 carries a rocker arm 31 pivoted at 32 to a connecting rod 33, carried by an outer wall of aneroid members 34. Core 11 has a fourth air-gap 35 with a rotor 36 of soft iron or other ferromagnetic substance, pivoted upon a shaft 37, which carries a crank arm 38 pivoted to a connecting link 39 at point 40. Link 39 is pivoted at point 41 to a bimetallic thermostatic element 42, which has one end fixed to any suitable base member.

The engine under observation drives a rotating breaker member 43, which bears against a breaker arm 44 having a contact 45 at its outer edge for alternately making and breaking contact with the grounded contact member 46. The other end of breaker arm 29 is connected to a battery 47 or ship power supply, having an electrical connection to a primary 48 of transformer 49, through the lead 50. Primary 48 is grounded, as indicated, at 51. Transformer 49 has an iron core 52, which is normally saturated when contacts 45 and 46 are closed, and the circuit including contacts 45 and 46, breaker arm 44, battery 47, lead 50 and grounded primary 48, forms an electrical alternating current generator when the circuit is made and broken at contacts 45 and 46 by the engine driving breaker 43. Transformer 49 has a secondary 53, which connects to the terminals 19 and 20 of winding 18 through the respective leads 54 and 55. A rectifier 56, which may be of the copper oxide type, is inserted in lead 55 so that the alternating voltage generated may be transformed to a pulsating direct current voltage in coil 18.

It is well known that the flux of a magnetic circuit of uniform cross-section in unsaturated condition will vary with the current carried by the magnetizing winding. It is also well known that the reluctance of a uniform magnetic circuit will vary with the change in cross-section of an air-gap. These conditions are utilized for obtaining, in the present invention, a compact power indicating device for internal combustion engines. The current in winding 18 will be a maximum at the maximum speed of the engine driving the breaker arm, 44. It will be a minimum at the minimum speed of the engine, as the magnetic forces tending to turn pointer 14 clockwise will vary with the frequency of pulsations of direct current flowing in winding 18.

The voltage generated in secondary 53 of transformer 49 will be determined by the formula $E = K\phi N$ where K is a constant, the value of which depends upon the number of turns of wire in the primary and secondary, the permeability of the core, the ratio of transformation, etc. $\phi$ is the flux set up in core 52 due to current flowing in primary 48, and N equals the frequency of the makes and breaks between contacts 45 and 46, which will vary, of course, with the speed of the engine driving the breaker member 43. In the above formula, it will be understood, therefore, that E will vary with either or both $\phi$ and N. Since core 52 is so designed that it will be completely saturated upon each make and break, then $\phi$ is a constant, and the voltage E will vary directly with N, which, of course, is directly proportional to the speed of the engine driving breaker 43. The direct current flowing in the closed circuit, including winding 18, will therefore vary with the speed of the engine under observation.

An increase in manifold pressure will cause bar 22 to be projected to the left, decreasing the reluctance of gap 21, thus allowing increased magnetic flux, and thus increasing the magnetic attraction of the poles formed at the rotor air-gap for the magnetic poles of the rotor 13. As the manifold pressure decreases, bar 22 is withdrawn to the right, thus increasing the reluctance of the air-gap, and decreasing the flux flowing in the core 11. The magnetic attraction for the permanent poles of rotor 13 therefore decreases. It is well understood, of course, that for a fixed manifold pressure, as the speed of an engine increases, the power output will increase. Conversely, for a fixed engine speed, as the intake manifold pressure increases, the power output increases. Further, where both manifold intake and engine speed increase, the power output increases. It is believed clear, then, that scale 15 may be calibrated directly in a power-rate unit, such as horsepower, to indicate the output of the engine under observation.

The above-described instrument is direct reading; that is, the power readings must be taken at a position adjacent core 11. This instrument might well be in the pilot's cock-pit, but if, in a particular installation, it is not feasible to mount core 11 directly in the cock-pit, then, by the embodiment shown in Fig. 2, core 11 may be placed close to the engine or in any desired point remote from the pilot's observation, and an additional indicating instrument 57 may be provided at the pilot's station. This instrument has a core of ferromagnetic material 58 with rotor 13 carrying a winding 59, which has terminals 60 and 61 in electrical connection with terminals 62 and 63, respectively, of a winding 64 carried by core 11, by means of conductors 65 and 66. Conductor 66 carries a rectifier 67, which may be of the same type as rectifier 56.

Aneroid members 34 act to rotate the permeable member 29 as the altitude of the instrument varies, and thus, the amount of magnetic flux in core 11 is varied in accordance with altitude. Power has a tendency to drop off with increase of altitude, due to the lowering of the intake pressure, and in order to properly compensate the indication, the reluctance of gap 28 is increased with altitude. Since this increases the over-all reluctance of core 11, the true indication of power will be accordingly lower (with increase of altitude) than without compensation. This compensation for power indications with altitude introduces a necessary correction required in the indicator, so that the power reading may be correct regardless of the altitude of the power plant.

A thermo-sensitive, bimetallic member 42 may be placed in the intake manifold or near it, so that changes in the temperature of the gas flowing through the manifold and into the bellows 25 will cause the bimetallic member to flex in either direction depending upon the temperature change, and rotate the permeable rotor 36 through the interconnecting linkage shown, thus introducing a compensation in the power readings for changes in the temperature of fluid in the manifold, which changes, as pointed out in the above-identified Manchester patent, affect the accuracy of the power readings. Power drops off when the temperature of the mixture in the intake manifold increases; thus, in compensating for temperature changes, the bi-metallic member 42 will turn rotor 36 to increase the reluctance of gap 35 with increasing temperatures of the gas in the intake manifold.

In the Gregg Patent No. 2,088,954, there is shown a bellows 36, the purpose of which is to prevent inaccurate regulation of a supercharger by a bellows 34, caused by the variation in the atmospheric pressure surrounding the bellows 34 open to manifold pressure. This compensation is described particularly well in page 2, lines 7 to 18 of the Gregg specification, and similar compensation may be afforded to the movement of flexible bellows 25, shown in the drawing of the present invention.

While two embodiments of the invention have been shown and described, it is understood that the invention is not to be limited to these two examples. It is intended, therefore, that the invention be limited only by the scope of the appended claims.

What is claimed is:

1. An engine power indicating system comprising a core member of soft iron having an air-gap, a magnetic rotor therein, a pointer carried by said rotor, a scale fixedly mounted for cooperation with said pointer, a second air-gap formed in said core, a bar of soft iron removably situated in said second air-gap, a bellows, a mechanical connection between said bar and said bellows, an intake manifold pressure conduit connected to said bellows, an electrical winding carried by said core, an engine-driven alternating current generator connected to said winding, means for rectifying the current in said winding supplied by said generator, and spring means connected to bias said rotor to move in one direction against the magnetic force induced in said rotor by the current in said winding, the reluctance of the magnetic circuit including said core and rotor being varied by movement of said bar in said second gap upon changes in manifold pressure, the voltage in said winding varying with the speed of said engine-driven generator so that indications of power by said pointer and said scale will vary with the speed of the engine driving said generator and with the manifold pressure in said bellows.

2. A meter for measuring power in accordance with the speed and the manifold pressure of an internal combustion engine, comprising an engine-driven electrical generator, a core of permeable material, said core having a first air-gap, a magnetic rotor therein and a pointer carried thereby, a scale mounted adjacent said pointer, a second air-gap, a bar of permeable material therein and movable to change the reluctance of the magnetic circuit including said core and said rotor, a winding on said core, direct current connections between said winding and said generator, a flexible pressure chamber open to manifold pressure, a connection between said flexible pressure chamber and said bar, means for biasing said rotor for movement in one direction, whereby, current in said winding will tend to urge said pointer to move against the action of said biasing means in accordance with the value of said current, said bar being movable upon changes in manifold pressure to influence the movement of said pointer by the change of reluctance occasioned by movement of said bar by said flexible pressure chamber.

3. A power meter for internal combustion engines comprising a core member of ferrous material, said core having a plurality of air-gaps, a rotor having magnetic poles within one of said air-gaps, an indicating pointer carried thereby, an indicating scale associated with said pointer, spring means for holding said pointer at a zero indication on said scale when at rest, a winding carried on said core, an engine-driven alternating current generator connected to said winding, means interposed between said winding and said generator for rectifying the current in said winding, a flexible chamber open to manifold pressure, a link connected thereto and movable upon changes in manifold pressure, a bar of permeable material connected to said link and movable thereby, said bar being disposed in another of said air-gaps, the voltage in said winding being proportional to the speed of the engine driving said generator, and the reluctance of said core member being proportional to changes of intake manifold pressure, whereby the power of the engine may be indicated by the position of said pointer on said scale.

4. An indicator of engine power of the type that depends on engine speed and manifold pressure, which comprises a meter having a core of ferrous material, said core having an air-gap containing a magnetic rotor, a pointer carried thereby, a scale mounted adjacent said pointer, said core having a ferrous element therein subject to movement to change the reluctance of said core, a winding carried on said core, an engine-driven generator, direct current connections extending between said generator and said winding, a flexible chamber open to intake manifold pressure, said chamber having a connection to said ferrous element, said element being moved by said flexible chamber upon changes in manifold pressure, whereby the power indicating position of said pointer with respect to said scale will vary with the speed of the engine and with its manifold pressure.

5. An indicator of engine power of the type that depends on engine speed and manifold pressure which comprises a meter having a core of ferrous material, said core having an air-gap containing a wire-wound rotor, a pointer carried thereby, a scale mounted adjacent said pointer, a second core of ferrous material having a plurality of air-gap spaces, a winding carried on said second core having connections to the wire of said wire-wound rotor, a second winding on said second core, an engine-driven alternating current generator, direct current connections between said generator and said second winding, one of said air-gap spaces containing a movable member of permeable material, a flexible bellows and said member having mechanical connection to said flexible bellows movable with changes in engine manifold pressure whereby for changing manifold pressure the reluctance of the air-gap containing said member will be varied to change the flux through said second core.

6. An engine power indicating system comprising a core member of soft iron having an air-gap, a wire-wound rotor therein, a pointer carried by said rotor, a scale mounted adjacent said pointer, a second core member of soft iron having an air-gap space, a bar of soft iron removably situated in said air-gap space, a bellows, a mechanical connection between said bar and said bellows, an intake manifold pressure conduit connected to said bellows, an electrical winding carried by said second core, electrical connections between said winding and the wire of said wire-wound rotor, a second winding on said second core, an engine driven alternating current generator connected to said second winding, means for rectifying the current in said second winding supplied by said generator, the reluctance of the magnetic circuit including said air-gap space in said second core being varied by movement of said bar in said air-gap space upon changes of engine manifold pressure, and the voltage in said electrical winding varying with the speed of said engine-driven generator so that indications of power by said pointer on said scale will vary with the speed of the engine driving said generator and with the manifold pressure in said bellows.

7. A power meter for internal combustion engines comprising an indicating member that indicates power changes as an interpretation of changes in the reluctance of a magnetic circuit, said magnetic circuit including a core of permeable material, a first air-gap space therein, a member of permeable material in said first air-gap space, a bellows open to engine manifold pressure and having a wall movable with changes in manifold pressure, a mechanical connection between said wall and said member of permeable material so that movements of said member will vary the reluctance of said first air-gap space, an engine driven generator, a winding on said core having direct current connections to said generator, said winding setting up flux in said core, a second air-gap space in said core, a second member of permeable material in said second air-gap space, a thermo-sensitive element exposed to engine manifold gas temperature and having movement in accordance with changes in said temperature, a mechanical connection between said second member and said thermo-sensitive element, so that movement thereby alters the reluctance across said second air-gap space, a third air-gap space in said core, a third member of permeable material in said third space, an aneroid member having an element thereof movable in response to changes in barometric pressure, and a mechanical connection between said element and said third member so that movement of said element produced by changes in barometric pressure will cause movement of said third member and a corresponding change in the reluctance of said third air-gap space.

3. A power meter for internal combustion engines comprising an indicator responsive to conditions of engine speed and engine manifold pressure, electromagnetic operating means for said indicator, said electromagnetic operating means including a coil for producing a magnetic field, an iron circuit including a magnetic element movable in said field and mechanically connected to said indicator to operate the latter, means for supplying energizing current to said coil, engine speed responsive means for controlling the intensity of coil energization produced by said current supplying means, and engine manifold pressure responsive means for varying the reluctance of said iron circuit, in accordance with variations in manifold pressure.

CHARLES I. MacNEIL.